US008880873B2

(12) United States Patent
Lu

(10) Patent No.: US 8,880,873 B2
(45) Date of Patent: Nov. 4, 2014

(54) METHOD, SYSTEM AND DEVICE FOR AUTHENTICATING CARDLESS TERMINAL USING APPLICATION SERVER

(75) Inventor: Xiaoming Lu, Beijing (CN)

(73) Assignee: China Mobile Communications Corporation, Beijing (CN)

(*) Notice: Subject to any disclaimer, the term of this patent is extended or adjusted under 35 U.S.C. 154(b) by 0 days.

(21) Appl. No.: 13/519,385

(22) PCT Filed: Dec. 28, 2010

(86) PCT No.: PCT/CN2010/002188
§ 371 (c)(1),
(2), (4) Date: Oct. 30, 2012

(87) PCT Pub. No.: WO2011/079522
PCT Pub. Date: Jul. 7, 2011

(65) Prior Publication Data
US 2013/0046971 A1    Feb. 21, 2013

(30) Foreign Application Priority Data

Dec. 28, 2009    (CN) .......................... 2009 1 0243594

(51) Int. Cl.
*H04L 29/06*    (2006.01)
*H04L 9/32*    (2006.01)

(52) U.S. Cl.
CPC .............. *H04L 9/321* (2013.01); *H04L 63/062* (2013.01); *H04L 65/1016* (2013.01); *H04L 65/1073* (2013.01); *H04L 63/061* (2013.01); *H04L 2209/80* (2013.01); *H04L 63/08* (2013.01); *H04L 65/1063* (2013.01); *H04L 2463/061* (2013.01)
USPC ............. 713/155; 713/168; 455/433; 726/12; 380/278

(58) Field of Classification Search
CPC ........................................................ H04L 9/32
USPC ....................................................... 713/155
See application file for complete search history.

(56) References Cited

U.S. PATENT DOCUMENTS

| 8,457,318 | B2* | 6/2013 | Gunther ........................ 380/278 |
| 2008/0016230 | A1* | 1/2008 | Holtmanns et al. ........... 709/229 |
| 2010/0115588 | A1* | 5/2010 | Johannesson et al. ............. 726/4 |

FOREIGN PATENT DOCUMENTS

| CN | 1700640 A | 11/2005 |
| CN | 101005359 A | 7/2007 |

(Continued)

OTHER PUBLICATIONS

An International Search Report and Written Opinion, dated Mar. 31, 2011 in International Application No. PCT/CN2010/002188.

(Continued)

*Primary Examiner* — Hadi Armouche
*Assistant Examiner* — Bryan Wright
(74) *Attorney, Agent, or Firm* — Lowe Hauptman & Ham, LLP

(57) ABSTRACT

An authentication method, system and device are provided by the embodiments of the present invention. Said method includes the following steps: an Application Server (AS) receives an AS access request, which carries a user identifier, transmitted by a User Equipment (UE); the AS generates a key generation request based on the user identifier and transmits it to a network side; the AS receives the key transmitted by the network side, and authenticates the UE according to the key. In the present invention, generating the key between a terminal without a card and the AS is implemented, and the AS authenticates the UE using the generated key, and the security of the data transmission is improved.

14 Claims, 7 Drawing Sheets

(56) References Cited

FOREIGN PATENT DOCUMENTS

| | | |
|---|---|---|
| CN | 101272297 A | 9/2008 |
| CN | 101437226 A | 5/2009 |
| CN | 101547095 A | 9/2009 |
| JP | 2007529763 A | 10/2007 |
| JP | 2007535259 A | 11/2007 |
| JP | 2008529368 A | 7/2008 |
| JP | 2008236033 A | 10/2008 |
| JP | 2008236183 A | 10/2008 |
| JP | 2008538471 A | 10/2008 |
| JP | 2009500902 A | 1/2009 |
| JP | 2009517937 A | 4/2009 |
| JP | 2011524652 A | 9/2011 |
| WO | 2008/058388 A1 | 5/2008 |

OTHER PUBLICATIONS

Chinese Office Action issued Feb. 16, 2013 for Patent Application No. 2009102435948.

Office Action in corresponding Japanese Application No. 2012-546310 dated Mar. 10, 2014, 7 pages.

Office Action in corresponding Korean Application No. 10-2012-7019645 dated Mar. 5, 2014, 13 pages.

Office Action in corresponding Chinese Application No. 2009102435948 dated Oct. 15, 2013, 11 pages.

Office Action in corresponding Japanese Application No. 2012-546310 dated Oct. 11, 2013, 7 pages.

* cited by examiner

METHOD, SYSTEM AND DEVICE FOR AUTHENTICATING CARDLESS TERMINAL USING APPLICATION SERVER

RELATED APPLICATIONS

The present application is a National Phase of International Application Number PCT/CN2010/002188, filed Dec. 28, 2010, and claims priority from Chinese Application Number 200910243594.8, filed Dec. 28, 2009.

FIELD OF THE INVENTION

The present invention relates to the field of telecommunication technology, especially to an authentication method, system and apparatus.

DESCRIPTION OF THE PRIOR ART

Along with the development of many kinds of service, IP Multimedia Subsystem (IMS) is introduced into the 3rd Generation Partnership Project (3GPP), and a User Equipment (UE) can effect various IMS applications via an IMS access network. Meanwhile, complexity of a service layer will be reduced by the IMS access, and different access networks or authentication mechanisms can be effectively shielded at the service layer, so as to provide a user with more converged service services and abundant service experiences than before.

When a UE accesses an IMS, it needs to authenticate a user ID at an IMS core network. With respect to authentication of the user ID when accessing the IMS, an IMS Authentication and Key Agreement (AKA) authentication mechanism is usually adopted for a card terminal, and a Subscriber Identity Module (SIM), Universal Subscriber Identity Module (USIM) or IMS Subscriber Identity Module (ISIM) in the terminal is used to authenticate the user ID. An authentication mechanism based on Session Initiation Protocol (SIP) Digest is adopted for a cardless terminal, and the user is asked to input a password so as to authenticate the user ID. After the authentication, the UE may access IMS and perform service operations with an application server. When encrypted data is transmitted between the UE and a service server, authentication is required between the service server and the UE in the case of the service operations concerning user privacy information or high-value contents, so as to ensure security of the transmission of the encrypted data between the service server and the UE.

With respect to a card terminal, a preset Ki/K in SIM/USIM/ISIM is used to generate a key between the UE and the service server through a General Bootstrapping Architecture (GBA), and then the key is used to effect authentication between the service server and the UE. However, with respect to a cardless terminal, there is no such scheme in the prior art to generate a key between a service server and a terminal and then effect the authentication therebetween based on the key. In addition to an IMS network, how to effect authentication between a cardless terminal and a service server in other network scenarios still remains a problem to be solved.

SUMMARY OF THE INVENTION

The present invention provides an authentication method, system and apparatus, so as to generate a key between a cardless terminal and a service server and authenticate the UE by the service server using the generated key. As a result, the security of data transmission can be improved.

The present invention provides an authentication method, comprising the steps of:

receiving, by an Application Server (AS), an AS access request containing a user ID from a User Equipment (UE);

generating, by the AS, a key generation request containing the user ID and an AS ID, and transmitting the request to a network side; and receiving, by the AS, a key generated according to the user ID, the AS ID and additional parameters from the network side, and authenticating the UE according to the key.

The step of generating, by an AS, a key generation request containing the user ID and an AS ID and transmitting the request to a network side comprises: generating, by the AS, a key generation request containing the user ID and the AS ID, and transmitting the request to an authentication server at the network side.

The step of receiving, by an AS, a key generated according to the user ID, the AS ID and additional parameters from the network side comprises: generating, by the authentication server, a key according to the user ID, the AS ID and additional parameters and transmitting the key to the AS.

The additional parameters include at least one of a user password, a random number, a validity period, and a fixed string.

The step of generating, by an AS, a key generation request containing the user ID and an AS ID and transmitting the request to a network side comprises: generating, by the AS, a key generation request containing the user ID and an AS ID, and transmitting the request to a gateway equipment at the network side.

The step of receiving, by an AS, a key generated according to the user ID, the AS ID and additional parameters from the network side comprises: generating, by the gateway equipment, an authentication data request according to the user ID, the AS ID and additional parameters and transmitting the request to the authentication server; generating, by the authentication server, a key according to the user ID, the AS ID and the additional parameters and transmitting the key to the gateway equipment; and receiving, by the gateway equipment, the key from the authentication server and transmitting the key to the AS.

The additional parameters include at least one of a user password, a random number, a validity period, a gateway equipment ID and a fixed string.

The step of generating, by an AS, a key generation request containing the user ID and an AS ID and transmitting the request to a network side comprises: generating, by the AS, a key generation request containing the user ID and an AS ID and transmitting the request to the gateway equipment.

The step of receiving, by an AS, a key generated according to the user ID, the AS ID and additional parameters from the network side comprises: generating, by the gateway equipment, an authentication data request containing the user ID and transmitting the request to the authentication server; generating, by the authentication server, a first key according to the user ID and transmitting the first key to the gateway equipment; and generating, by the gateway equipment, a key according to the first key, the AS ID and additional parameters and transmitting the key to AS.

The step of generating, by the authentication server, a first key according to the user ID comprises: generating, by the authentication server, a key according to the user ID and additional parameters. The additional parameters include at least one of a user password, a random number, a validity period, a gateway equipment ID and a fixed string.

The gateway equipment generates a key according to the first key, the AS ID and additional parameters. The additional parameters include at least one of a random number, a validity period, a gateway equipment ID and a fixed string.

The step of generating, by an AS, a key generation request containing the user ID and an AS ID and transmitting the request to a network side comprises: generating, by the AS, a key generation request containing the user ID and an AS ID and transmitting the request to the gateway equipment.

The step of receiving, by an AS, a key generated according to the user ID, the AS ID and additional parameters from the network side comprises: generating, by the gateway equipment, a key according to the first key, the AS ID and additional parameters and transmitting the key to the AS; and when the first key is a key agreement request received by the gateway equipment from the UE, transmitting an authentication data request containing the user ID to the authentication server, receiving the first key generated by the authentication server according to the user ID and stored in the authentication server.

The present invention further provides an authentication system, comprising:

an application server AS for receiving an AS access request containing a user ID from a User Equipment UE, generating a key generation request containing the user ID and an AS ID according to the user ID, transmitting the request to an authentication server at a network side, receiving a key from the authentication server, and authenticating UE according to the key; and an authentication server for receiving a key generation request containing the user ID and the AS ID from AS, generating a key according to the user ID, the AS ID and additional parameters, and transmitting the key to AS.

The present invention further provides an authentication system, comprising:

an application server AS for receiving an AS access request containing a user ID from a User Equipment UE, generating a key generation request containing the user ID and an AS ID according to the user ID, transmitting the request to a gateway equipment, receiving a key transmitted by the gateway equipment, and authenticating UE according to the key;

a gateway equipment for receiving a key generation request containing the user ID and the AS ID from AS, generating an authentication data request containing the user ID and the AS ID and transmitting the request to the authentication server, receiving a key from the authentication server and transmitting the key to AS; or receiving a key generation request containing the user ID and the AS ID from AS, generating an authentication data request containing the user ID and the AS ID and transmitting the request to the authentication server, receiving a first key from the authentication server, generating a key according to the first key, the AS ID and additional parameters and transmitting the key to AS; or generating a key according to a first key, the AS ID and additional parameters and transmitting the key to AS, transmitting an authentication data request containing the user ID to the authentication server when the first key is a key agreement request received by the gateway equipment from UE, receiving the first key generated by the authentication server according to the user ID, and storing the first key; and an authentication server for receiving an authentication data request containing the user ID and the AS ID from the gateway equipment, generating a key according to the user ID, the AS ID and additional parameters, and transmitting the key to the gateway equipment; or receiving an authentication data request containing the user ID from the gateway equipment, generating a key according to the user ID, and transmitting the key to the gateway equipment.

The present invention further provides an AS, comprising:

a reception and transmission module for receiving an AS access request containing a user ID from a UE, generating a key generation key containing the user ID and an AS ID according to the user ID, transmitting the request to a network side, and receiving a key from the network side; and an authentication module for authenticating UE according to the key received by the reception and transmission module.

The present invention further provides an authentication server, comprising:

a reception module which is configured to receive a key generation request containing a user ID and an AS ID from an AS, or receive an authentication data request containing a user ID and an AS ID from a gateway equipment, or receive an authentication data request containing a user ID from a gateway equipment;

a generation module which is configured to generate a key according to the user ID, the AS ID and additional parameters when the reception module receives the key generation request containing the user ID and the AS ID from the AS, or generate a key according to the user ID, the AS ID and additional parameters when the reception module receives the authentication data request containing the user ID and the AS ID from the gateway equipment, or generate a key according to the user ID when the reception module receives the authentication data request containing the user ID from the gateway equipment; and a transmission module which is configured to transmit the key generated by the generation module.

The present invention further provides a gateway equipment, comprising:

a reception module which is configured to receive a key generation request containing a user ID and an AS ID from an AS, and receive a key from an authentication server;

a generation module which is configured to generate an authentication data request containing the user ID and the AS ID, or generate an authentication data request containing the user ID, and generate a key according to the key received by the reception module from the authentication server, the AS ID and additional parameters; and a transmission module which is configured to transmit the authentication data request containing the user ID and the AS ID generated by the generation module to the authentication server, and transmit the key received from the authentication server to the AS, or transmit an authentication data request containing the user ID generated by the generation module to the authentication server, and transmit the key generated by the generation module to the AS.

Through the technical solutions provided by the present invention, a key is generated between the cardless terminal and the service server, and then the generated key is used by the service server to authenticate the UE, thereby the security of data transmission can be improved.

The other features and advantages of the present invention will be described subsequently, and will partially become obvious in the specification or will be understood by implementing the present invention. The object and the other advantages of the present invention may be effected and acquired by the structures specially mentioned in the specification, claims and the drawings.

The technical solutions of the present invention will be further described hereinafter based on the drawings and the examples.

BRIEF DESCRIPTION OF THE DRAWINGS

In order to clearly illustrate the technical solutions of the present invention or the prior art, following are the figures desired for the description of the present invention or the prior art. Obviously, these figures depict some embodiments of the present invention for the purpose of illustration only. One skilled in the art will readily obtain the other figures in accordance with these figures without any creative effort.

DETAILED DESCRIPTION OF THE PREFERRED EMBODIMENTS

The embodiments of the present invention will be described hereinafter in conjunction with the drawings. It is to be appreciated that the embodiments are merely illustrative but not definitive to the present invention.

Clear and complete descriptions on the technical solutions of the present invention are made hereinafter in conjunction with the drawings. Obviously, the embodiments are merely part but not all of the embodiments of the present invention. Based on these embodiments, a person skilled in the art can obtain all other embodiments without any creative effort, which all fall within the scope of the present invention.

Figure 1:
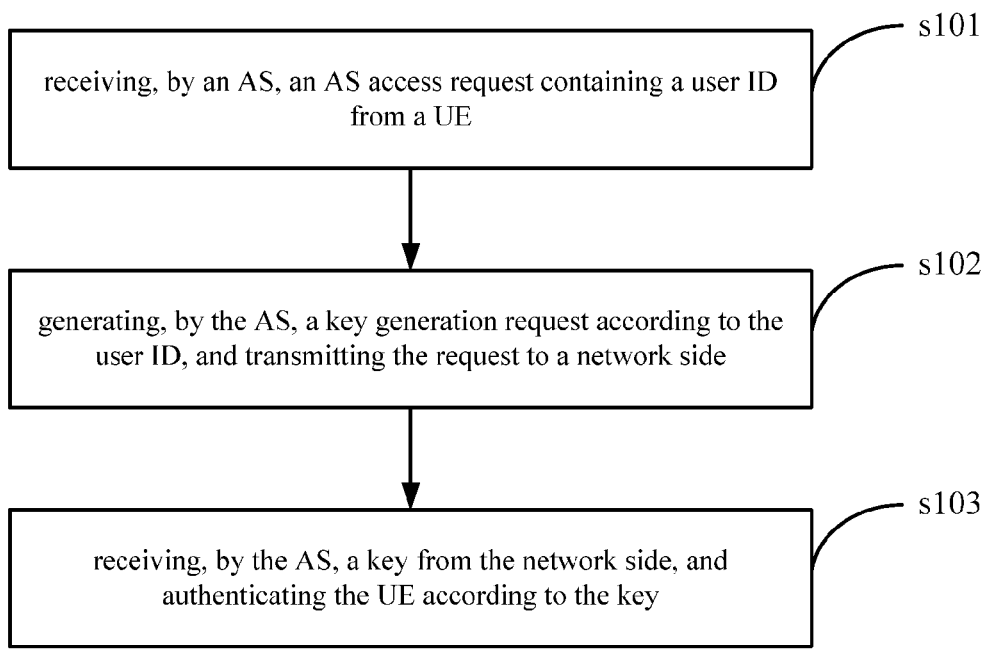
FIG. 1 is a flow diagram showing an authentication method according to the first embodiment of the present invention.

The first embodiment of the present invention provides an authentication method, and as shown in FIG. 1, the method comprises the following steps:

Step S101: receiving, by an AS, an AS access request containing a user ID from a UE;

Step S102: generating, by the AS, a key generation request according to the user ID, and transmitting the request to a network side; and Step S103: receiving, by the AS, a key from the network side, and authenticating the UE according to the key.

Through the method provided in this embodiment, a key is generated between a cardless terminal and an AS, and the generated key is used to perform authentication between the AS and the UE. As a result, the security of data transmission will be improved.

Following are the detailed descriptions on the authentication method provided in this embodiment in conjunction with the specific examples.

In an application scenario concerned in the embodiments, a UE is a cardless terminal When the cardless terminal accesses an IMS network to perform service processings, authentication is performed between the cardless terminal and an Application server (AS), so as to enhance security of data transmission. As a result, when a UE accesses an AS, the AS requests the network side to generate a key between the AS and the UE for the authentication therebetween.

This embodiment is not limited to generating a key for the authentication when a UE accesses an IMS network. Also, the schemes provided by this embodiment can be used to generate a key and perform authentication according to the generated key when mutual authentication is required between the UE and the network side. The scope of the present invention will not be affected by any changes in the application scenarios.

It is to be noted that, in this embodiment, when the UE logs on an IMS core network, the IMS core network will need to authenticate the user ID of the UE prior to the authentication between the UE and the AS. Moreover, the IMS core network will store relevant information about the user, including a user name, a user password and an IMPU when the user logs on the IMS core network.

To be specific, the IMS core network includes the functional entities such as Call Session Control Function (CSCF) and Home Subscriber Server (HSS). CSCF includes three logical entities: P-CSCF, I-CSCF and S-CSCF. P-CSCF is an access point for a terminal user to access IMS, so as to complete user registration, QoS control and security management, etc. I-CSCF takes charge of interoperability between the IMS domains, controls allocation of S-CSCF, hides network topology and configuration information, and produces charging data. S-CSCF is a service switching center for IMS for executing session control, maintaining session state, controlling user information and producing charging information. HSS stores the subscriber information for supporting the processings of calls and sessions by the network entities. The data of the UE is just stored in HSS.

The standard procedure for a UE to access IMS includes: initiating by the UE an access to IMS, and using a user password input by the user to perform authentication at the IMS core network. To be specific, the UE initiates a SIP Digest request to S-CSCF according to the user password and performs IMS registration authentication. CSCF transmits the login status of the registered user to HSS, and HSS stores the login status information of the user. The login status information includes the relevant information such as a user name, a user password and IMPU, etc.

After the authentication is completed at the IMS core network using the password input by the user, the relevant information of the user is stored in the IMS core network and can be used to generate a key between a UE and an AS. As a result, after the authentication is completed at the IMS core network and the relevant information of the user is stored, the IMS authentication is no longer necessary during the generation of a key between the UE and the AS.

Figure 2:
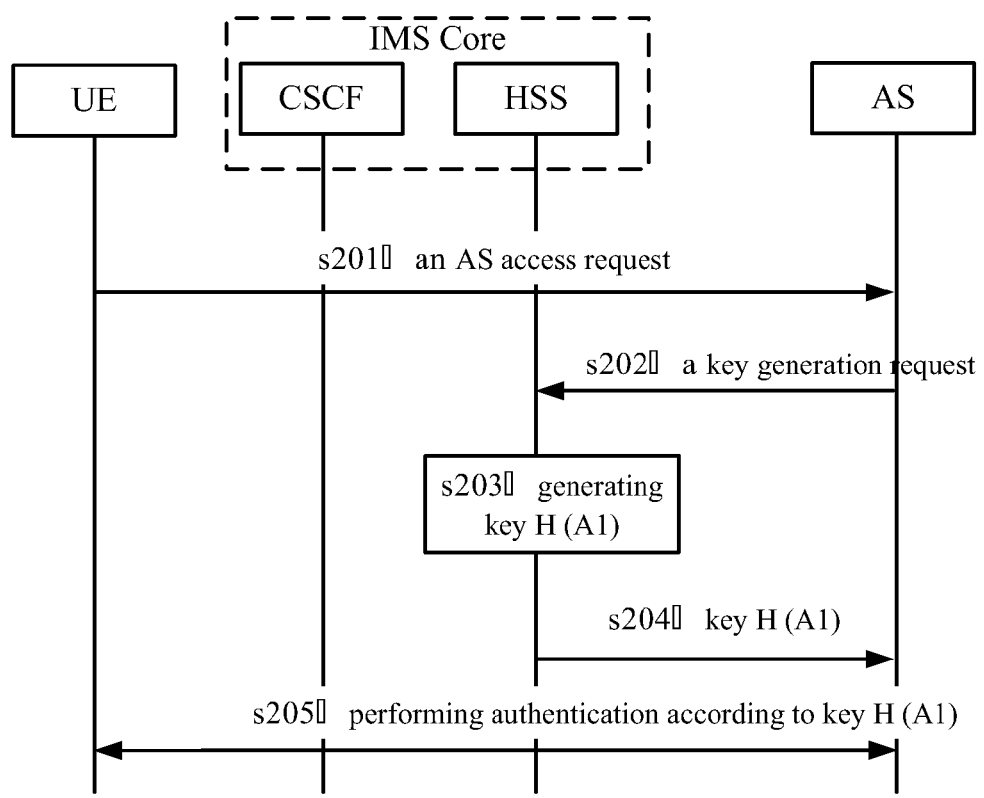
FIG. 2 is a flow diagram showing an authentication method according to the second embodiment of the present invention.

To be specific, the second embodiment of the present invention provides an authentication method, in which an AS receives an AS access request containing a user ID from a UE, transmits a key generation request to an authentication server at a network side, such as HSS, according to the user ID, and receives a key from HSS. As shown in FIG. 2, the authentication method comprises the following steps.

Step S201: transmitting, by a UE, an AS access request containing a user ID to an AS.

The UE accesses the AS and transmits an AS access request to the AS. The AS access request contains the user ID, which may be IP Multimedia Public Identity (IMPU), IP Multimedia Private Identity (IMPI) or other IDs. In the subsequent embodiments of the present invention, IMPU is taken as an example for illustration.

Step S202: transmitting, by the AS, a key generation request containing IMPU and an AS ID to HSS.

The AS generates a key generation request containing IMPU and the AS ID according to IMPU contained in the AS access request, and transmits the key generation request to HSS. The IMPU and AS ID are used for generating a key between the AS and the UE. The AS ID may be Fully Qualified Domain Name (FQDN), or any other relevant AS IDs such as AS service name, alias, and IP address information. In this embodiment, an AS domain name is taken as an example for illustration. AS domain name is an inherent attribute of an AS, and different ASs may have different AS domain names.

Step S203: receiving, by HSS, the key generation request from the AS, and generating a key H (A1) according to a user's IMPU and the AS domain name contained in the key generation request, or generating a key H (A1) according to the IMPU, the AS domain name and additional parameters.

HSS receives the key generation request containing IMPU and the AS ID from the AS, and calculates using the method defined in the HTTP Digest protocol according to IMPU and the AS domain name contained in the key generation request, to generate the key H (A1), or HSS calculates using the method defined in the HTTP Digest protocol according to IMPU, the AS domain and the additional parameters to generate the key H (A1). The additional parameters include at least one of a user password, a random number, a validity period and a fixed string.

The condition where HSS generates the key H (A1) according to IMPU, the AS domain name and the user password is taken hereinafter as an example for illustration. It is to be noted that, when the key is generated between an AS and a UE for the authentication, common information between HSS and the UE can also be used as a key generation element. For example, the key calculated when HSS and the UE agree to adopt the same algorithm, and the characteristic information of the user may be used as the key generation elements. The details will not be described herein.

Step S204: transmitting, by HSS, the generated key H (A1) to the AS.

Step S205: authenticating, by the AS, the UE according to the received key H (A1).

The AS performs HTTP Digest authentication on the UE according to the received key H (A1).

For instance, the AS receives the key H (A1) from HSS at the network side, and the key is generated by HSS according to IMPU, the AS domain name and the user password. During the authentication between the AS and the UE, the UE may use the same calculation method as for the AS to calculate the key H (A1). To be specific, the UE acquires the password and IMPU when the user performs IMS access authentication. In addition, the UE may also acquire the AS domain name to be accessed. The UE generates a key according to the acquired password, IMPU and AS domain name. There exists a one-to-one correspondence between the key generated by UE and the key H (A1) received by AS.

It is to be appreciated that, during the authentication between UE and AS, the keys corresponding to a plurality of ASs are unnecessary to be stored in UE, and UE may generate the key when authentication is desired. Identical algorithm and key generation elements are used for the generation of the key by a UE and the generation of the key by HSS, and there exists a one-to-one correspondence between the key generated by UE and the key received by AS. As a result, the demands for development and security strength of UE will be reduced, and the cost will be saved.

Figure 3:
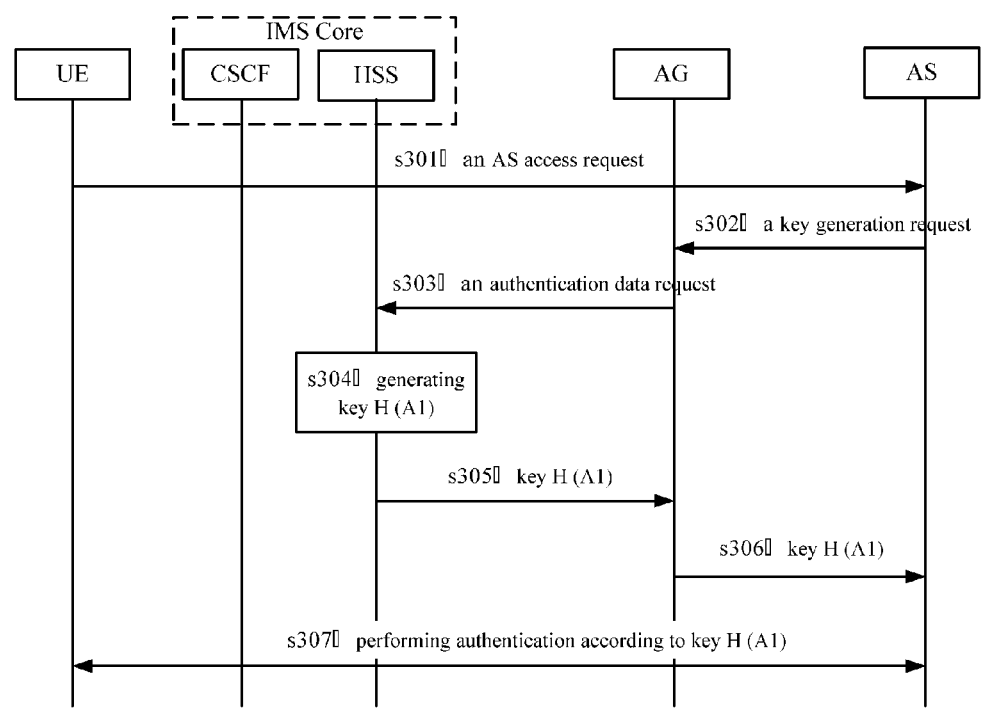
FIG. 3 is a flow diagram showing an authentication method according to the third embodiment of the present invention.

The third embodiment of the present invention provides an authentication method, in which an AS receives an AS access request containing a user ID from a UE, transmits a key generation request to a gateway equipment at a network side, such as Access Gateway (AG), according to the user ID, and acquires a key through interaction between AG and an authentication server at the network side such as HSS. As shown in FIG. 3, the method comprises the following steps.

Step S301: transmitting, by a UE, an AS access request containing IMPU to an AS.

Step S302: transmitting, by the AS, a key generation request containing IMPU and an AS domain name to an AG.

The AS transmits the key generation request to the AG, and the key generation request contains IMPU and the AS domain name.

Step S303: transmitting, by AG, an authentication data request containing IMPU and the AS domain name to HSS.

AG generates the authentication data request according to the key generation request and transmits it to HSS, and the authentication data request contains IMPU and the AS domain name. To be specific, the authentication data request transmitted from AG to HSS may be an MAR request which contains IMPU and the AS domain name. The MAR request of an interface between AG and HSS includes an AS domain name in addition to an MAR request of a standard Cx interface.

It is to be noted that, AG receives the key generation request from AS, and the key generation request contains IMPU and the AS domain. AG transmits the authentication data request to HSS, and the authentication data request contains IMPU and the AS domain name. During this procedure, no processing is performed by AG on the received IMPU and AS domain name, and a proxy AS transmits a request to HSS so as to trigger HSS to generate a key, thereby communication between AS and the IMS core network is effected by AG.

In this embodiment, an AS accesses the IMS core network through AG and requests to generate a key. As a result, adverse influence on the load of the IMS core network caused by direct access of a plurality of ASs to the IMS core network and instability of the IMS core network caused by frequent accesses of the plurality of ASs to the IMS core network will be avoided. In addition, when an AS is in an unsafe situation, adverse influence on the security of the IMS core network caused by direct access of the unsafe ASs to the IMS core network will be prevented.

Step S304: generating, by HSS, a key H (A1). To be specific, HSS generates the key H (A1) according to IMPU and the AS domain name, or generates the key H (A1) according to IMPU, the AS domain name and additional parameters. The additional parameters include at least one of a random number, a validity period, a gateway equipment ID and a fixed string.

For example, HSS uses IMPU, the AS domain name and additional parameters (e.g., a user password and a random number) as the key generation elements, and calculates in a method as defined in the HTTP Digest protocol to obtain the key H (A1).

In this step, the key H (A1) is generated according to the password, user's IMPU, the AS domain name and the additional parameters, thus the obtained key H (A1) is associated with the AS domain name and the user. When a same user performs multiple service processings, it needs to perform authentication between a UE and a plurality of ASs and to generate a key corresponding to each AS. Different ASs may have different AS domain names, thus the keys generated between the user and the plurality of ASs are different. The calculation of the key H (A1) using the AS domain name ensures the exclusivity of the key between the user and the plurality of ASs. The security of the other ASs will not affected even if one of ASs is attacked.

Step S305: transmitting, by HSS, the key H (A1) to AG.

Step S306: transmitting, by AG, the key H (A1) to AS.

The AG receives the key H (A1) from HSS, and performs no additional processing on the key H (A1) but directly transmits the received key H (A1) to AS. The AS may use the key for the authentication between AS and UE.

Step S307: authenticating, by AS, the UE according to the received key H (A1).

The AS receives the key H (A1) from AG, and the key H (A1) is associated with the user and AS. To be specific, when authentication is performed between a same user and a plurality of ASs, each AS has a different AS domain name, and the key H (A1) corresponding to each AS is unique. The AS may directly use the key H (A1) for authentication, i.e., the AS directly uses the key H (A1) to initiate an HTTP Digest authentication between AS and UE.

If AS needs to further generate a key between it and UE, it may make agreement with UE to adopt the same algorithm so as to derive a Session key from the key H (A1), and the authentication between AS and UE is performed through the Session Key. The authentication between AS and UE is not repeated herein.

It is to be noted that, in this embodiment, the communication between an AS and the IMS core network is effected by AG. To be specific, when a key is required to be generated between AS and UE, AG receives a key generation request from AS, and initiates an authentication data request to HSS. The authentication data request contains IMPU and the AS domain name. The AS receives the key H (A1) generated by HSS according to the authentication data request and transmits the key H (A1) to AS. As a result, during the generation of the key H (A1), AG, instead of each AS, accesses the IMS core network and carries the data interaction between AS and HSS.

Figure 4:
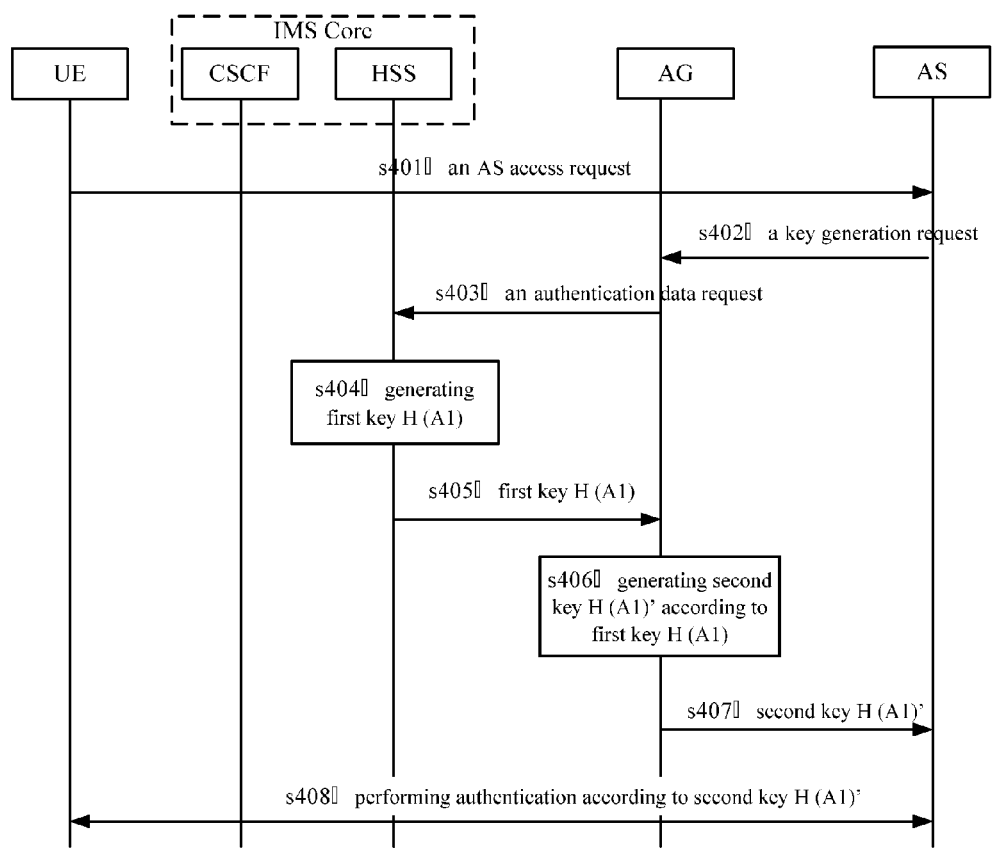
FIG. 4 is a flow diagram showing an authentication method according to the fourth embodiment of the present invention.

The fourth embodiment of the present invention provides an authentication method, in which a gateway equipment at a network side, such as AG, receives a key generation request from an AS, transmits the request to an authentication server at the network side such as HSS, receives a first key generated by HSS, generates a second key according to the first key, and transmits the generated second key to the AS. As shown in FIG. 4, the method comprises the following steps.

Step S401: initiating, by a UE, an AS access request containing IMPU.

Step S402: transmitting, by an AS, a key generation request containing IMPU and an AS domain name to AG.

Step S403: transmitting, by AG, an authentication data request containing IMPU to HSS.

In this step, the AG receives the key generation request from the AS, and the key generation request contains IMPU and the AS domain name. The AG transmits the authentication data request to HSS according to the key generation request. The authentication data request merely contains IMPU.

Step S404: generating, by HSS, a first key H (A1). To be specific, HSS may generate the first key H (A1) according to IMPU contained in the authentication data request, or according to IMPU and additional parameters contained in the authentication data request. The additional parameters include at least one of a random number, a validity period, a gateway equipment ID and a fixed string.

For example, HSS receives the authentication data request from AG, and the authentication data request contains IMPU. HSS generates the first key H (A1) according to IMPU, a user password and the additional parameters. During the generation of the first key H (A1), the AS domain name is not an key generation element for the first key H (A1), and the generated first key H (A1) is not associated with the AS domain name. When a user performs service processings with a plurality of ASs, the first key H (A1) generated by HSS is a fixed value with respect to the same user, regardless of any changes for the AS domain name. Therefore, the first key H (A1) is merely associated with the user.

Step S405: transmitting, by HSS, the first key H (A1) to AG.

The first key H (A1) transmitted from HSS to AG is not associated with AS, but merely associated with the user.

Step S406: AG generates the second key H (A1)' according to the first key H (A1) and the AS domain name, or according to the first key H (A1), the AS domain name and additional parameters. The additional parameters include at least one of a password, a random number, a validity period, a gateway equipment ID and a fixed string.

AG generates the second key H (A1)' according to the first key H (A1) and the AS domain name, and the key generation request received by AG contains the AS domain name. As a result, the second key H (A1)' generated according to the first key and the AS domain name is associated with the user and AS. Each AS corresponds to an unique second key H (A1)', and the authentication is performed between AS and UE using the second key H (A1)'.

Step S407: transmitting, by AG, the second key H (A1)' to the AS.

The second key H (A1)' transmitted from AG to the AS is associated with the user and the AS. The second keys H (A1)' corresponding to different ASs are different. The authentication is performed between AS and UE using the second key H (A1)' based on the uniqueness of the second key H (A1)'.

Step S408: authenticating, by AS, the UE according to the received second key H (A1)'.

It is to be noted that, in this embodiment, AG transmits an authentication data request to HSS according to the key generation request from AS, and the authentication data request contains IMPU. HSS generates the first key H (A1) according to IMPU, and the first key H (A1) is merely associated with the user but irrelevant to AS. HSS transmits the first key H (A1) to AG, and AG generates the second key H (A1)' according to the first key H (A1) and the AS domain name. The second key H (A1)' is associated with AS and the user. After AS receives the second key H (A1)', the authentication is performed between AS and UE using the second key H (A1)'. Therefore, in this embodiment, AG not only carries the data transmission between AS and the IMS core network, but also generates the second key H (A1)' according to the first key H (A1) returned by the IMS core network and the AS domain name contained in the key generation request, and transmits the second key H (A1)' to AS for an authentication between AS and UE.

Figure 5:
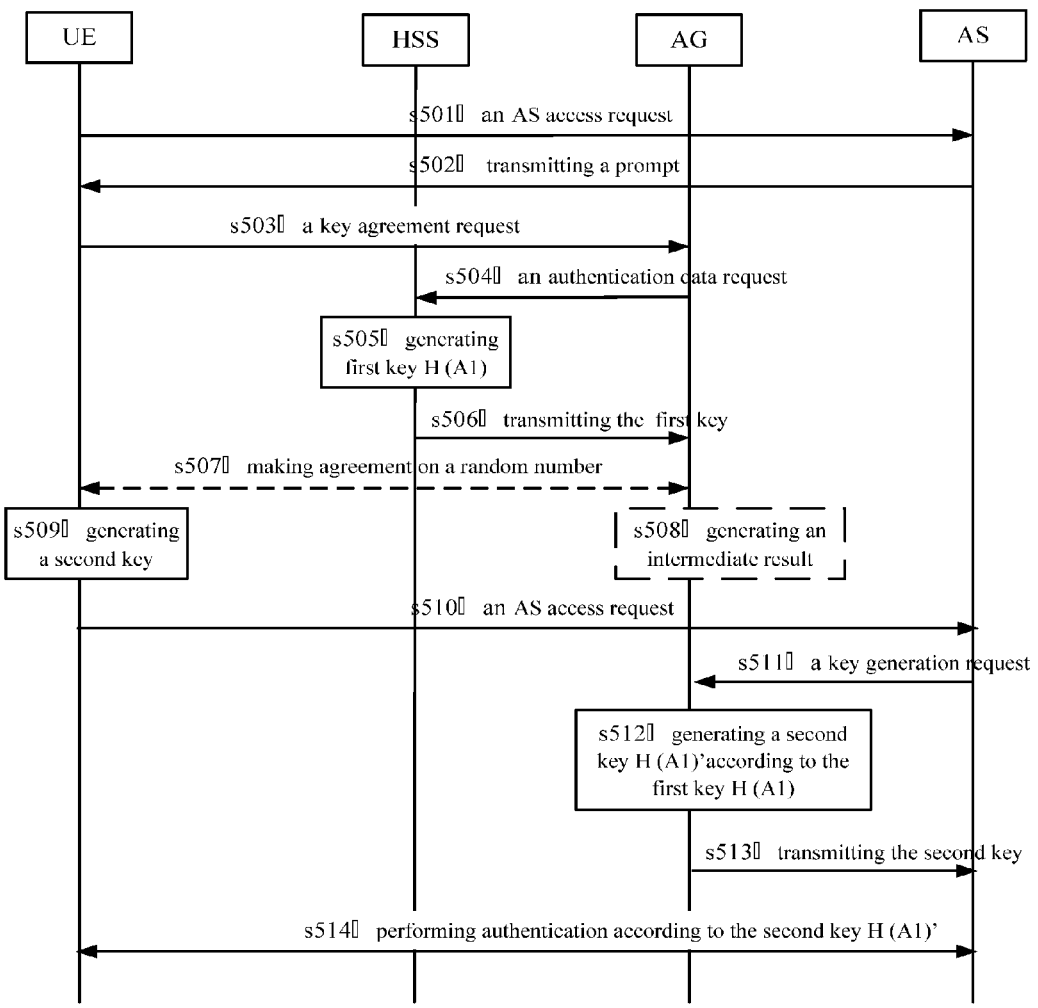
FIG. 5 is a flow diagram showing an authentication method according to the fifth embodiment of the present invention.

The fifth embodiment of the present invention provides an authentication method, in which a gateway equipment at a network side, such as AG, acquires a first key in advance from an authentication server such as HSS and stores the first key, generates a second key according to the acquired first key when receiving a key generation request from an AS, and transmits the generated second key to AS. As shown in FIG. 5, the method comprises the following steps.

Step S501: initiating, by a UE, an AS access request containing user's IMPU.

Step S502: transmitting, by the AS, an prompt to UE to prompt that key authentication is required.

Step S503: transmitting, by the UE, a key agreement request to AG.

The key agreement request transmitted by UE contains user's IMPU.

Step S504: transmitting, by AG, an authentication data request to HSS.

The authentication data request contains IMPU, or IMPU and an AS domain name. Preferably, the authentication data request may further contain IMPU and an AG ID, or IMPU, an AS domain name and an AG ID.

Step S505: generating, by HSS, a first key H (A1).

To be specific, HSS may generate the first key H (A1) according to IMPU contained in the authentication data request, or according to IMPU contained in the authentication data request and additional parameters. The additional parameters include at least one of a password, a random number, a validity period, a gateway equipment ID and a fixed string.

For example, HSS receives an authentication data request from AG, and the authentication data request contains user's IMPU. HSS generates the first key H (A1) according to the IMPU, a password and the additional parameters. During the generation of the first key H (A1), the AS domain name is not a key generation element for the first key H (A1), and the generated first key H (A1) is not associated with the AS domain name. When a user performs service processings with a plurality of ASs, the first key H (A1) generated by HSS with respect to a same user is a fixed value regardless of any changes for the AS domain names. Therefore the first key H (A1) is merely associated with the user.

Step S506: transmitting, by HSS, the first key H (A1) to AG.

The first key H (A1) transmitted from HSS to AG is merely associated with the user but irrelevant to AS.

After acquiring the first key H (A1), AG stores the acquired first key H (A1).

Step S507: making, by AG, agreement on a random number with UE.

For example, AG transmits challenge information containing a random number to UE, and the UE transmits challenge response information to directly respond the challenge information from AG, or UE transmits challenge response information containing a modified or reselected random number to AG.

Step S508: generating, by AG, an intermediate result for the key calculation according to the agreed random number.

For example, AG determines to use the random number in the challenge information transmitted by itself, or the random number modified by UE, or the random number reselected by UE according to the challenge response information from UE, and calculates according to the first key to acquire the intermediate result for the key calculation.

The above-mentioned steps S507 and S508 are optional. After AG performs steps S507 and S508 to calculate the intermediate result, it stores the intermediate result and returns 2000K information to UE.

Step S509: calculating, by UE, a second key for a service request.

The UE generates a first key H (A1) according to IMPU, or according to IMPU and additional parameters. The additional parameters include at least one of a password, a random number, a validity period, a gateway equipment ID and a fixed string.

The calculation of a second key according to the first key H (A1) includes calculating the second key according to the first key and the AS domain name. When steps S507 and S508 are selected to be performed, the calculation of the second key according to the first key, the agreed random number and the AS domain name includes calculating the intermediate result for key calculation according to the first key and the agreed random number, and then calculating the second key according to the intermediate result and the AS domain name. The AS domain name is just an AS ID.

Step S510: initiating, by UE, an AS access request containing IMPU.

The UE uses the calculated second key to transmit encrypted information to an AS.

Step S511: transmitting, by the AS, a key generation request to AG.

The AS generates the key generation request containing IMPU and the AS domain name, and transmits the request to a gateway equipment at a network side such as AG.

Step S512: generating, by AG, a second key according to the first key.

In this embodiment, AG generates the second key H (A1)'. To be specific, AG generates the second key H (A1)' according to the first key H (A1) acquired in advance from HSS and the AS domain name, or according to the first key H (A1), the AS domain and additional parameters. The additional parameters include at least one of a password, a random number, a validity period, a gateway equipment ID and a fixed string.

The first key acquired in advance from HSS may be the first key H (A1) acquired when receiving the key agreement request from UE.

With respect to the condition where calculation is performed according to the random number, agreement is made in the above-mentioned step S507 to acquire the random number. Optionally, if step S508 is performed to generate an intermediate result, the second key H (A1)' may be calculated directly according to the intermediate result and the AS domain name. If without an intermediate result, an intermediate result for key calculation is calculated according to the random number agreed in step S507 and the first key H (A1), and then the second key H (A1)' is calculated according to the intermediate result and the AS domain name. As a result, the second key H (A1)' is calculated according to the first key H (1), the random number and the AS domain name.

AG generates the second key H (A1)' according to the received first key H (A1) and the AS domain name, and the key generation request received by AS contains the AS domain name. As a result, the second key H (A1)' generated according to the first key and the AS domain name is associated with the user and AS, and each AS corresponds to an unique second key H (A1)'. The authentication is performed between AS and UE using the second key H (A1)'.

Step S513: transmitting the generated second key H (A1)' to AS.

The second key H (A1)' transmitted from AG to AS is associated with the user and AS, and the second keys H (A1)' corresponding to different ASs are different. The authentication is performed between AS and UE using the second key H (A1)' based on the uniqueness of the second key H (A1)'.

Step S514: authenticating, by AS, the UE according to the received second key.

The AS may also use the second key to encrypt the data to be transmitted so as to perform encrypted data interaction with UE.

In other words, in this embodiment, the step of receiving, by AS, the key transmitted from the network side and generated according to the user ID, the AS ID and the additional parameters includes generating, by the gateway equipment, a key according to the first key, the AS ID and the additional parameters, transmitting the key to AS, and as different from the fourth embodiment, transmitting an authentication data request containing the user ID to an authentication server when the first key is a key agreement request transmitted from UE to the gateway equipment, receiving the first key generated by the authentication server according to the user ID, and stored in the authentication server.

It is to be noted that, in this embodiment, AG transmits the authentication data request to HSS according to the key generation request from AS during the key agreement with UE, generates the first key H (A1) according to IMPU, and generates the second key H (A1)' according to the first key H (A1)

and the AS domain name. The first key H (A1) is merely associated with the user but irrelevant to AS. The second key H (A1)' is associated with AS and the user. After AS receives the second key H (A1)', the authentication is performed between AS and UE using the second key H (A1)'. As a result, in this embodiment, AG not only carries the data transmission between AS and the IMS core network, but also generates the second key H (A1)' according to the first key H (A1) returned by the IMS core network and the AS domain name contained in the key generation request, and transmits the second key H (A1)' to AS for the authentication between AS and UE.

Through the authentication method provided in this embodiment, a key is generated between the cardless terminal and AS, and the key is then used for the authentication between AS and UE, so as to solve the problem in the prior art that it is impossible to perform authentication between the cardless terminal and AS.

In this embodiment, data exchange between AS and the IMS core network is effected by AG. As a result, adverse influence on the load of the IMS core network caused by direct access of a plurality of ASs to the IMS core network and instability of the IMS core network caused by frequent accesses of the plurality of ASs to the IMS core network will be avoided. In addition, when AS is in an unsafe situation, adverse influence on the security of the IMS core network caused by direct access of the unsafe ASs to the IMS core network will be prevented.

In addition, the key between AS and UE may use a password as the key generation element, but AS cannot obtain the password according to the received key. Hence, the security of the user will not be under threat even if AS is in an unsafe situation, thereby the security of the whole IMS network will not be affected.

Further, the key for the authentication between AS and UE is generated according to the user ID, the AS ID and the additional parameters, thus when a user performs multiple service processings, the keys generated between the user and a plurality of ASs are different, and the calculation of the key H (A1) using the AS domain name ensures the uniqueness of the key between the user and the plurality of ASs. The security of the other services of the user will not be affected even if one of ASs is attacked.

It is to be noted that, the generation procedure of the key between AS and UE in this embodiment is irrelevant to the communication protocol therebetween, and it may be adapted to an IMS AS, or a non-IMS AS. Thus, it can be applied to many cases. The authentication server in this embodiment may be HSS in IMS, or a device for managing the user password in any other authentication system, such as a Radius/AAA server.

Through the authentication method provided in this embodiment, a key is generated between the cardless terminal and AS, and then the generated key is used to perform authentication between AS and UE, so as to improve the security of data transmission and solve the problem in the prior art that it is impossible to perform authentication between the carless terminal and AS.

The embodiment of the present invention provides an authentication system, comprising:

an AS for receiving an AS access request containing a user ID from a UE, generating a key generation request containing the user ID and an AS ID according to the user ID, transmitting the request to an authentication server at a network side, receiving a key from the authentication server, and authenticating the UE according to the key; and an authentication server for receiving the key generation request contained the user ID and the AS ID from the AS, generating a key according to the user ID and the AS ID, and transmitting the key to the AS. Preferably, the authentication server generates the key according to the user ID, the AS ID and additional parameters, and transmits the key to the AS.

The embodiment of the present invention further provides an authentication system, comprising:

an AS for receiving an AS access request containing a user ID from a UE, generating a key generation request containing the user ID and an AS ID according to the user ID, transmitting the request to a gateway equipment at a network side, receiving a key from the gateway equipment, and authenticating the UE according to the key;

a gateway equipment for receiving a key generation request containing the user ID and the AS ID from the AS, generating an authentication data request containing the user ID and the AS ID, transmitting the request to an authentication server, receiving a key from the authentication server and transmitting the key to the AS; or receiving a key generation request containing the user ID and the AS ID from the AS, generating an authentication data request containing the user ID, transmitting the request to an authentication server, receiving a first key from the authentication server, generating a key according to the first key and the AS ID, and transmitting the key to the AS, and preferably, generating a key according to the first key, the AS ID and additional parameters and transmitting the key to the AS; or generating a key according to the first key, the AS ID and additional parameters, transmitting the key to the AS, wherein when the first key is a key agreement request received by the gateway equipment from UE, transmitting an authentication data request containing the user ID to the authentication server, receiving the first key generated by the authentication server according to the user ID and stored the first key in the authentication server; and an authentication server for receiving an authentication data request containing the user ID and the AS ID from the gateway equipment, generating a key according to the user ID and the AS ID, and transmitting the key to the gateway equipment, preferably, generating a key according to the user ID, the AS ID and additional parameters, and transmitting the key to the AS; or receiving an authentication data containing the user ID from the gateway equipment, generating a key according to the user ID, and transmitting the key to the gateway equipment.

Figure 6:
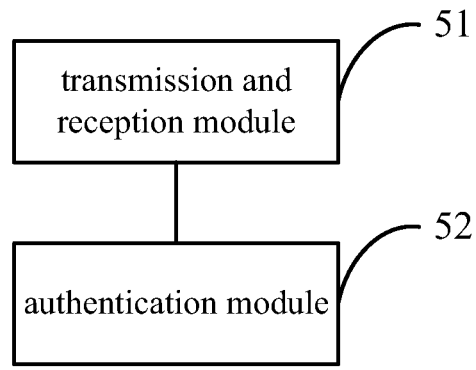
FIG. 6 is a schematic view showing an AS according to the sixth embodiment of the present invention.

The embodiment of the present invention further provides an AS, and as shown in FIG. 6, it comprises:

a transmission and reception module 51 for receiving an AS access request containing a user ID from a UE, generating a key generation request containing the user ID and an AS ID according to the user ID, transmitting the request to a network side, and receiving a key from the network side; and an authentication module 52 for authenticating UE according to the key received by the transmission and reception module 51.

Figure 7:
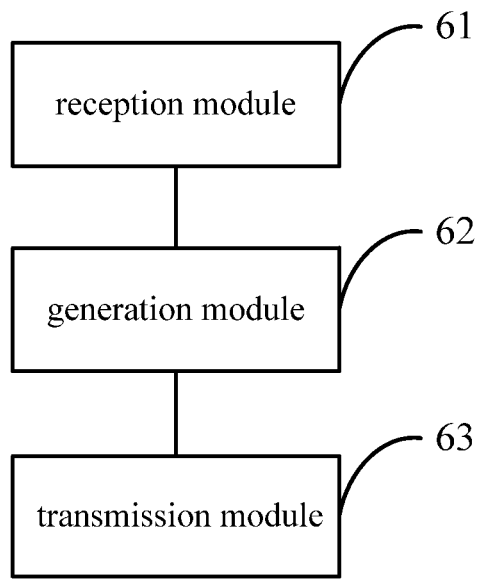
FIG. 7 is a schematic view showing an authentication server according to the seventh embodiment of the present invention.

The embodiment of the present invention further provides an authentication server, and as shown in FIG. 7, the authentication server comprises:

a reception module 61 for receiving a key generation request containing a user ID and an AS ID from an AS, or receiving an authentication data request containing a user ID and an AS ID from a gateway equipment, or receiving an authentication data request containing a user ID from a gateway equipment;

a generation module 62 for generating a key according to the user ID and the AS ID when the reception module 61 receives the key generation request containing the user ID and the AS ID from the AS, or generating a key according to the user ID and the AS ID when the reception module 61 receives an authentication data request containing the user ID and the AS ID from the gateway equipment, or generating a key according to the user ID when the reception module 61 receives an authentication data request containing the user ID from the gateway equipment, preferably, generating a key according to the user ID, the AS ID and additional parameters and transmitting the key to AS; and a transmission module 63 for transmitting the key generated by the generation module 62.

Figure 8:
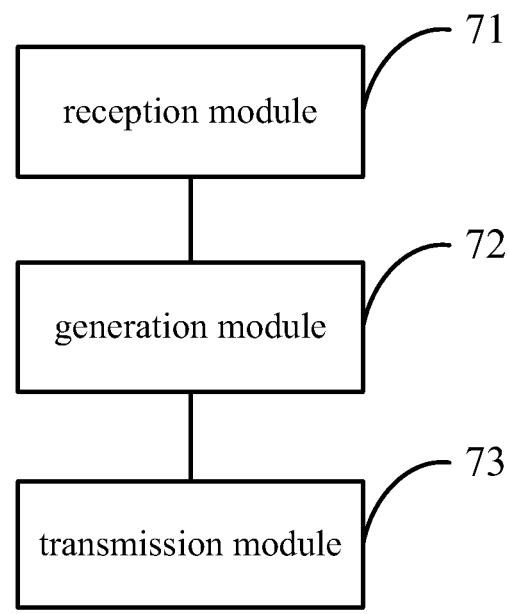
FIG. 8 is a schematic view showing a gateway equipment according to the eighth embodiment of the present invention.

The embodiment of the present invention further provides a gateway equipment, and as shown in FIG. 8, the gateway equipment comprises:

a reception module 71 for receiving a key generation request containing a user ID and an AS ID from an AS, and receiving a key from an authentication server;

a generation module 72 for generating an authentication data request containing the user ID and the AS ID, or generating an authentication data request containing the user ID, and generating a key according to the key and the AS ID received by the reception module 71 from the authentication server, preferably, generating a key according to the user ID, the AS ID and additional parameters and transmitting the key to AS; and a transmission module 73 for transmitting the authentication data request containing the user ID and the AS ID generated by the generation module 71 to the authentication server, transmitting the key received by the authentication server to AS, or transmitting the authentication data request containing the user ID generated by the generation module 72 to the authentication server, and transmitting the key generated by the generation module 72 to the AS.

Through the authentication system and apparatus provided in the embodiments of the present invention, a key is generated between a cardless terminal and an AS, and the generated key is then used to perform authentication between AS and UE, so as to improve the security of data transmission.

Based on the above descriptions, a person skilled in the art can clearly understand that the present invention can be implemented by means of software as well as a necessary common hardware platform, or by means of hardware. However, in many situations, the former is preferred. Based on this concept, the technical solution of the present invention, or the portion thereof contributing to the prior art, can be realized as a software product. The software product is stored in a storage medium and includes several instructions so as to enable a terminal (which may be a mobile phone, a personal computer, a server or a network device) to execute the methods described in the embodiments of the present invention.

The above are merely the preferred embodiments of the present invention. It should be noted that, any improvements and modifications may be made by a person skilled in the art without departing from the principle of the present invention. These improvements and modifications shall also be considered as within the scope of the present invention.

What is claimed is:

1. A method for authenticating a cardless terminal, the method comprising:

receiving, by an Application Server (AS), an AS access request containing a user identifier (ID) from a User Equipment (UE), wherein the UE is the cardless terminal;

generating, by the AS, a key generation request containing the user ID and an AS ID;

transmitting the key generation request to a gateway equipment at a network side, wherein the gateway equipment forms a authentication data request according to the key generation request;

transmitting, by the gateway equipment, the authentication data request to an Home Subscriber Station (HSS), wherein the authentication data request comprises the user ID;

generating, by the HSS, a first key, according to the user ID contained in the authentication data request, transmitting, by the HSS, the first key to the gateway equipment;

generating, by the gateway equipment, a second key, according to the first key, the AS ID and a secret key parameter;

receiving, by the AS, the second key generated by the gateway equipment; and authenticating, by the AS, the UE according to the second key.

2. The method according to claim 1, wherein the secret key parameter includes at least one of a user password, a random number, a validity period and a fixed string.

3. The method according to claim 1, wherein the transmitting, by the AS, the key generation request to the HSS comprises transmitting, by the AS, the key generation request via a gateway equipment at the network side; and wherein the receiving, by the AS, the key comprises:

generating, by the gateway equipment, an authentication data request containing the user ID and the AS ID, transmitting, by the gateway equipment, the authentication data request to the HSS, generating, by the HSS, the key according to the user ID, the AS ID and the secret key parameter, transmitting, by the HSS, the key to the gateway equipment, receiving, by the gateway equipment, the key from the HSS, and transmitting, by the gateway equipment, the key to the AS.

4. The method according to claim 3, wherein the secret key parameter includes at least one of a user password, a random number, a validity period, a gateway equipment ID and a fixed string.

5. The method according to claim 1, wherein the transmitting, by the AS, the key generation request to the HSS comprises transmitting, by the AS, the key generation request via a gateway equipment; and wherein the receiving, by the AS, the key comprises:

generating, by the gateway equipment, an authentication data request containing the user ID, transmitting, by the gateway equipment, the authentication data request to the HSS, generating, by the HSS, a first key according to the user ID, transmitting, by the HSS, the first key to the gateway equipment, generating, by the gateway equipment, the key according to the first key, the AS ID and the secret key parameter, and transmitting, by the gateway equipment, the key to the AS.

6. The method according to claim 5, wherein the generating, by the HSS, the first key according to the user ID comprises:

generating, by the HSS, the first key according to the user ID and at least one of a user password, a random number, a validity period, a gateway equipment ID and a fixed string; and wherein, in the generating, by the gateway equipment, the key according to the first key, the AS ID and the secret key parameter, the secret key parameter includes at least one of the random number, the validity period, the gateway equipment ID and the fixed string.

7. The method according to claim 1,
wherein the transmitting, by the AS, the key generation request to the HSS comprises transmitting, by the AS, the key generation request via a gateway equipment;
wherein the receiving, by the AS, the key comprises:
generating, by the gateway equipment, the key according to a first key, the AS ID and the secret key parameter, and
transmitting, by the gateway equipment, the key to the AS; and
wherein the generating, by the gateway equipment, the key comprises:
transmitting, by the gateway equipment and when a key agreement request is received by the gateway equipment from the UE, an authentication data request containing the user ID to the HSS,
receiving, by the gateway equipment, the first key generated by the HSS according to the user ID, and
storing, by the gateway equipment, the first key.

8. A system for authenticating a cardless terminal, the system comprising:
a computer processor,
an Application Server (AS) having a controller, the controller is configured to
receive an AS access request containing a user identifier (ID) from a User Equipment (UE) wherein the UE is the cardless terminal,
generate a key generation request containing the user ID and an AS ID according to the user ID,
transmit the key generation request to a gateway equipment at a network side, wherein the gateway equipment forms a authentication data request according to the key generation request and transmits the authentication data request to an Home Subscriber Station (HSS), wherein the authentication data request comprises the user ID;
the HSS generates, a first key, according to the user ID contained in the authentication data request and the first key to the gateway equipment;
the gateway equipment generates a second key, according to the first key, the AS ID and a secret key parameter;
the AS further configured to authenticate the UE according to the second key.

9. The system according to claim 8, further comprising:
a gateway equipment having a controller, the controller is configured to
receive the key generation request containing the user ID and the AS ID from the AS,
generate an authentication data request containing the user ID and the AS ID,
transmit the authentication data request to the HSS,
receive the key from the HSS, and
transmit the key to the AS; wherein the AS is configured to transmit the request to the gateway equipment, and receive the key transmitted by the gateway equipment; and
wherein the HSS
receive the authentication data request containing the user ID and the AS ID from the gateway equipment,
generate the key according to the user ID, the AS ID and the secret key parameter, and
transmit the key to the gateway equipment.

10. An application server (AS), comprising:
a transceiver and receiver which is configured to
receive an AS access request containing a user identifier (ID) from a User Equipment (UE) wherein the UE is a cardless terminal,
generate a key generation request containing the user ID and an AS ID according to the user ID,
transmit the key generation request to a gateway equipment at a network side, wherein the gateway equipment forms a authentication data request according to the key generation request and transmits the authentication data request to an Home Subsriber Station (HSS), wherein the authentication data request comprises the user ID;
generate, by the HSS, a first key, according to the user ID contained in the authentication data request,
transmitting, by the HSS, the first key to the gateway equipment;
generating, by the gateway equipment, a second key, according to the first key, the AS ID and a secret key parameter;
receive, by the AS, the second key generated by the gateway equipment; and
authenticate, by the AS, the UE according to the second key.

11. An Home Subscriber Station (HSS), comprising:
a receiver which is configured to receive
a key generation request containing a user identifier (ID) and an Application Server (AS) ID from an AS, or
an authentication data request containing a user ID and an AS ID from a gateway equipment, or
an authentication data request containing a user ID from a gateway equipment;
a processor which is configured to generate
a key according to the user ID, the AS ID and a secret key parameter when the receiver receives the key generation request containing the user ID and the AS ID from the AS, or
a key according to the user ID, the AS ID and a secret key parameter when the receiver receives the authentication data request containing the user ID and the AS ID from the gateway equipment, or
a key according to the user ID when the receiver receives the authentication data request containing the user ID from the gateway equipment; and
a transmitter which is configured to transmit the key generated by the processor.

12. A gateway equipment, comprising:
a receiver which is configured to receive
a key generation request containing a user identifier (ID) and an Application Server (AS) ID from an AS, and
a key from an Home Subscriber Station (HSS);
a processor which is configured to generate
an authentication data request containing the user ID and the AS ID, or
an authentication data request containing the user ID, and a further key according to the key received by the receiver from the HSS, the AS ID and a secret key parameter; and
a transmitter which is configured to
transmit the authentication data request containing the user ID and the AS ID generated by the generation module to the HSS, and transmit the key received from the HSS to the AS, or
transmit the authentication data request containing the user ID generated by the processor to the HSS, and transmit the further key generated by the processor to the AS.

13. The system according to claim 8, further comprising:
a gateway equipment having a controller, the controller which is configured to
   receive the key generation request containing the user ID and the AS ID from the AS,
   generate an authentication data request containing the user ID and transmit the authentication data request to the HSS,
   receive a first key from the HSS,
   generate the key according to the first key, the AS ID and the secret key parameter, and
   transmit the key to the AS; and
wherein the AS having a processor, the processor is configured to
   transmit the key generation request to the gateway equipment, and
   receive the key transmitted by the gateway equipment; and
wherein the HSS
   receives the authentication data request containing the user ID from the gateway equipment,
   generates the first key according to the user ID, and
   transmits the first key to the gateway equipment.

14. The system according to claim 8, further comprising:
a gateway equipment having a controller, the controller is configured to
   generate the key according to a first key, the AS ID and the secret key parameter, and
   transmit the key to the AS;
wherein the controller is further configured to
   transmit, when a key agreement request is received by the gateway equipment from the UE, an authentication data request containing the user ID to the HSS
   receive the first key generated by the HSS according to the user ID, and store the first key;
wherein the AS
   transmits the key generation request to the gateway equipment, and
   receives the key transmitted by the gateway equipment; and
wherein the HSS
   receives the authentication data request containing the user ID from the gateway equipment,
   generates the first key according to the user ID, and
   transmits the first key to the gateway equipment.

* * * * *